(12) United States Patent
Beene

(10) Patent No.: US 6,385,030 B1
(45) Date of Patent: May 7, 2002

(54) REDUCED SIGNAL LOSS SURGE PROTECTION CIRCUIT

(75) Inventor: Gerald W. Beene, Southlake, TX (US)

(73) Assignee: Marconi Communications, Inc., Cleveland, OH (US)

(*) Notice: Subject to any disclaimer, the term of this patent is extended or adjusted under 35 U.S.C. 154(b) by 0 days.

(21) Appl. No.: 09/388,630

(22) Filed: Sep. 2, 1999

(51) Int. Cl.⁷ .................................................. H02H 9/00
(52) U.S. Cl. .......................... 361/119; 361/56; 361/111; 361/113
(58) Field of Search ..................... 361/119, 56, 58, 361/115, 111, 113

(56) References Cited

U.S. PATENT DOCUMENTS

| | | | |
|---|---|---|---|
| 4,314,304 A | 2/1982 | Baumbach | 361/124 |
| 4,325,100 A | 4/1982 | Bambach | 361/119 |
| 4,422,121 A | 12/1983 | Baumbach | 361/119 |
| 4,710,846 A | 12/1987 | Heisinger | 361/119 |
| 4,796,150 A | 1/1989 | Dickey et al. | 361/119 |
| 4,876,621 A | 10/1989 | Rust et al. | 361/58 |
| 4,907,120 A | 3/1990 | Kaczmarek et al. | 361/119 |
| 4,958,253 A | 9/1990 | Gilberts et al. | 361/119 |
| 4,964,160 A | 10/1990 | Taube et al. | 361/56 |
| 4,999,731 A | 3/1991 | Bender et al. | 361/119 |
| 5,057,964 A | 10/1991 | Bender et al. | 361/118 |
| 5,101,317 A | 3/1992 | Cwirzen et al. | 361/119 |
| 5,155,649 A | 10/1992 | Hung et al. | 361/124 |
| 5,195,015 A | 3/1993 | Kaczmarek | 361/119 |
| 5,224,008 A | 6/1993 | Popat et al. | 361/56 |
| 5,327,318 A | 7/1994 | Popat et al. | 361/55 |
| 5,334,553 A | 8/1994 | Popat et al. | 437/209 |
| 5,375,030 A | 12/1994 | Simpson et al. | 361/118 |
| 5,428,494 A | 6/1995 | Ahuja | 361/62 |
| 5,440,441 A | 8/1995 | Ahuja | 361/62 |
| 5,523,916 A | 6/1996 | Kaczmarek | 361/119 |
| 5,691,872 A | 11/1997 | Cohen | 361/119 |
| 5,706,157 A | 1/1998 | Galecki et al. | 361/63 |
| 5,706,160 A | 1/1998 | Latuszkin et al. | 361/119 |
| 5,712,755 A | * 1/1998 | Glaser et al. | 361/119 |
| 5,734,542 A | 3/1998 | Cohen | 361/119 |
| 5,748,430 A | 5/1998 | Bird | 361/119 |
| 5,768,081 A | 6/1998 | Cohen et al. | 361/119 |
| 5,815,389 A | 9/1998 | Plow et al. | 363/67 |
| 5,841,620 A | * 11/1998 | Masghati | 361/119 |
| 5,844,761 A | 12/1998 | Place, IV | 361/104 |
| 5,880,919 A | 3/1999 | Napiorkowski et al. | 361/117 |
| 5,953,194 A | 9/1999 | Atkins | 361/119 |
| 5,963,414 A | 10/1999 | Bird | 361/119 |
| 5,991,136 A | 11/1999 | Kaczmarek et al. | 361/93.8 |

* cited by examiner

Primary Examiner—Stephen W. Jackson
(74) Attorney, Agent, or Firm—Jones, Day, Reavis & Pogue

(57) ABSTRACT

A surge protection circuit is coupled to the wires that transport digital signals between a local unit, such as an ONU, and a remote unit, such as a NID. The surge protection circuit includes a coordinating impedance having a capacitive element connected in series with the twisted pair wires coupling the ONU to the NID. The coordinating impedance couples a primary shunt protector and a secondary shunt protector. Various embodiments of the surge protection circuit comprise coordinating impedance devices including a series connected: capacitor and resistor, capacitor and inductor, and capacitor, inductor, and resistor. By using a capacitive element in the coordinating impedance, the signal loss through the surge protector is significantly reduced for 10 Base-T and 100 Base-T Ethernet systems. Further, the added inductance may become part of an integrated low-pass filter that further reduces signal loss at high frequencies.

14 Claims, 4 Drawing Sheets

REDUCED SIGNAL LOSS SURGE PROTECTION CIRCUIT

BACKGROUND OF THE INVENTION

1. Field of the Invention

The present invention relates to surge protection circuits. In particular, the invention relates to a surge protection circuit for Ethernet networks that carry high-speed digital signals, wherein the circuit provides protection equivalent to that required for outside telephony equipment.

2. Description of the Related Art

Telephone lines typically carry voice and data signals from a remote unit to a local unit. In the preferred environment of the invention, which is a fiber-to-the-curb digital loop carrier system, the remote unit is a remote digital terminal (RDT), and the local unit is an optical network unit (ONU). The ONU distributes digital signals received from the RDT to a plurality of Network Interface Devices (NIDs), which are coupled to single homes or buildings. The NIDs provide an interface between the wiring outside the home or building and the wiring inside the structure serviced by the NID. The NIDs also provide surge protection and a means for disconnecting the inside wiring from the external wiring for testing purposes.

From the NID, digital signals are transmitted to internal electronic devices that use the signals, e.g., computers, telephones, televisions, etc., which are preferably located inside the single home or building. These internal devices are also referred to as customer premises equipment (CPE). The electrical lines between the ONUs and the NIDs typically include twisted pairs of wires. For 10 Base-T Ethernet networks, there is a first twisted pair used for incoming signals and a second twisted pair used for outgoing signals. These twisted pairs are susceptible to voltage and current surges due to lightning strikes or power (50 or 60 Hz) surges. Therefore, surge protection circuits (located in the NID, ONU or both) are coupled to the lines to protect the ONUs, the NID, and the CPE from being damaged by the over-voltage and over-current conditions.

FIG. 1 sets forth presently known surge protection circuit 10. The equipment-side input terminals 22 and 24 of the surge protection circuit 10 are coupled either to the ONU or the CPE, depending on the location of the circuit (either at the ONU or the NiD). The output terminals 18 and 20 are coupled to the outside twisted pair wiring loop between the ONU and the NID, which is exposed to lighting strikes and power fault surges. The surge protection circuit 10 includes a primary shunt protector 26 and a secondary shunt protector 28. The protectors 26 and 28 are coupled together by coordinating resistance devices 30 and 32, which are connected in series with the input and output terminals of the device.

The primary shunt protector 26 is preferably a tip-to-ground and ring-to-ground gas tube protector, or a 3-element gas tube. When there is a surge on the twisted pair wires connected to output terminals 18 and 20, the primary protector 26 fires when the surge reaches the firing voltage of the tube. The primary protector 26 protects against surges of thousands of amps and thousands of volts. It does this by presenting a low-resistance path to ground when it fires, so that the voltage developed across it becomes small after firing. But there are still potentially damaging surges that may pass through the primary protector 26. These may be surges that exceed the DC firing voltage of the protector 26, or they may be AC signals that never reach the firing voltage of the primary protector 26, but which would be damaging to the ONU, the NID, or the CPE.

To provide further protection, the surge protection circuit 10 also includes a secondary protector 28. This secondary protector 28 further reduces the surges that are passed by the primary protector 26. Typically, the secondary protector 28 includes a semiconductor-type shunt voltage clamp, such as a bi-directional thyristor or zener diode. The secondary protector 28 is not capable of surviving the extreme surges that occur if the primary protector 26 does not fire. Thus, without the coordinating resistance devices 30 and 32, the secondary protector 28 would clamp down the voltage such that the voltage would never become large enough to fire the primary protector 26. This happens because the semiconductor-type shunt clamp of the secondary protector 28 fires faster than the gas tube of the primary protector 26, e.g., in nanoseconds as compared to microseconds. Accordingly, if the coordinating resistance devices 30 and 32 are not used, the semiconductor protector 28 takes the entire surge, and thus prevents the gas tube 26 from firing. For this reason, the coordinating resistance devices 30 and 32 are placed in-line between the two protectors 26, 28.

In another known art system, a fuse is used in place of the coordinating resistance devices 30 and 32. In this system, opening of the fuses 30 and 32 by the surge allows the primary protector 26 to fire, but this also eliminates the data path, since the blown fuses are open-circuits and the fuses 30 and 32 must be replaced. One possible solution to fuse replacement is to use a resettable fuse. These devices are commonly used and they function as resistors until the current through them causes the device to reach a critical temperature. At the critical temperature, the resistance increases by several orders of magnitude. After the surge current dissipates, the resistance of the device returns to a low value.

Using resistors or resettable fuses as the coordinating resistance devices 30 and 32, however, causes an undesirable signal loss in the data transmission system at high frequency. Thus, a new surge protection circuit is needed in this field that is particularly well-suited for high frequency data applications.

SUMMARY OF THE INVENTION

In accordance with the present invention, a surge protection circuit is coupled to the wires that transport digital signals between a local unit, such as an ONU, and a remote circuit, such as a NID. The surge protection circuit includes a coordinating impedance having a capacitive element connected in series with the twisted pair wires coupling the ONU to the NID. The coordinating impedance couples a primary shunt protector and a secondary shunt protector. Various embodiments of the surge protection circuit comprise coordinating impedance devices including a series connected: capacitor and resistor, capacitor and inductor, and capacitor, inductor, and resistor. By using a capacitive element in the coordinating impedance, the signal loss through the surge protector is significantly reduced for 10 Base-T and 100 Base-T Ethernet systems. Further, the added inductance may become part of an integrated low-pass filter that further reduces signal loss at high frequencies.

As will be appreciated, the invention is capable of other and different embodiments, and its several details are capable of modifications in various respects, all without departing from the spirit of the invention. Accordingly, the drawings and description of the preferred embodiments are to be regarded as illustrative in nature and not restrictive.

BRIEF DESCRIPTION OF THE DRAWINGS

The present invention will be apparent to those skilled in the art in view of the accompanying drawings, where.

DETAILED DESCRIPTION OF THE DRAWINGS

Figure 1:
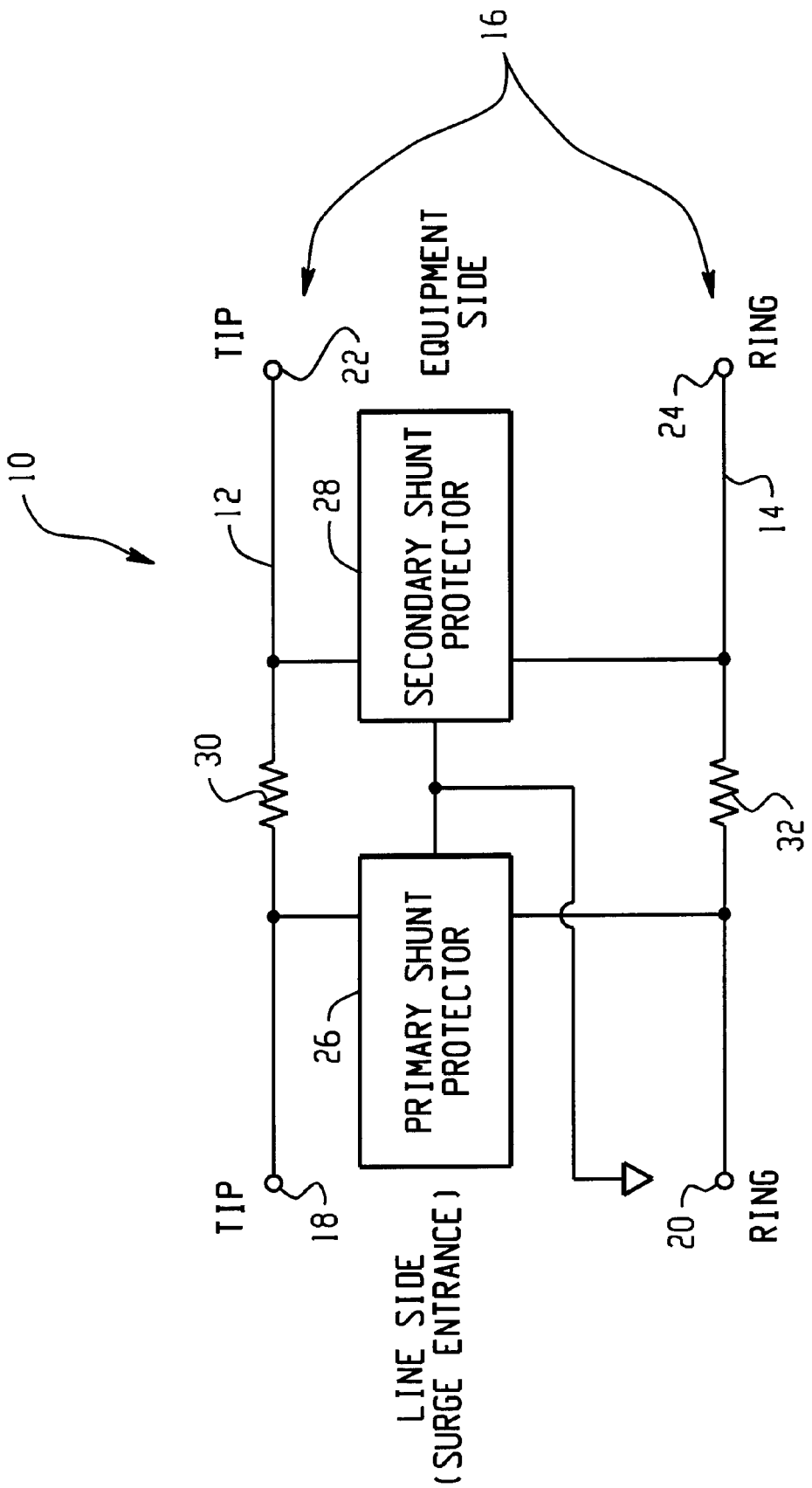
FIG. 1 is a schematic diagram of a known surge protection circuit.
Figure 2:
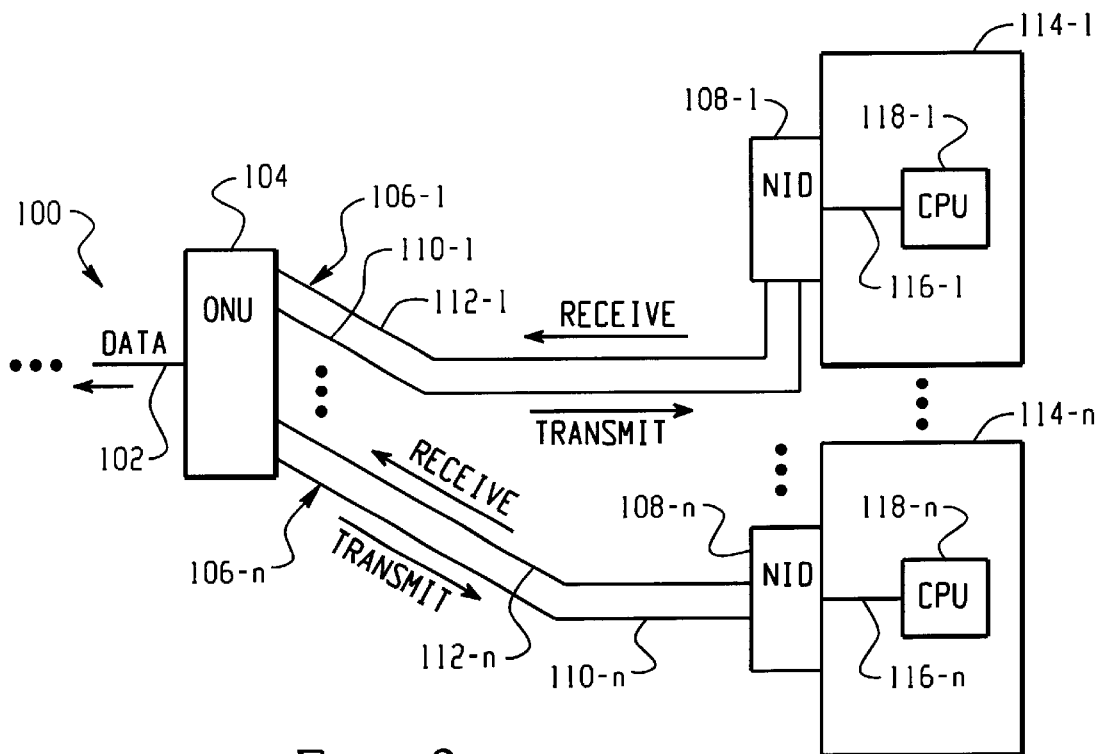
FIG. 2 is perspective view of a system that includes a surge protection circuit of the present invention.

Turning now to the drawing figures, FIG. 2 sets forth a signal transmission system 100 in a preferred digital loop-carrier configuration. The system 100 includes a first signal transmission element 102 that carries digital signals from a transmitting device (not shown), preferably a remote digital terminal unit, to a first receiving device 104, which is preferably an optical network unit (ONU). From the ONU 104, a second transmission element 106-n, preferably including first and second twisted pairs of wires, carries the digital signals to and from a second receiving apparatus 108-n, preferably a network interface device (NID). The first twisted pair is a transmit pair 110-n and the second twisted pair is a receive pair 112-n. The NID 108-n is mounted on or in a structure 114-n, preferably a house or building. Within the structure 114-n, a third transmission line 116-n, which is similar to line 106-n in configuration, carries the signals to one or more third receiving devices 118-n, which are preferably electronic devices that may include a processing unit, such as a computer, a television, or telephonic equipment. These electronic devices within the house or building are also known to as customer premises equipment (CPE).

The ONU 104 is a device that is used as an interface between fiber optic telecommunications lines 102 and traditional twisted pair or coaxial wires 106-n for providing telecommunications services, such as cable television and telephonic services, to a home or a building 114-n. Signals on the data line 102 are separated by the ONU 104 and then multiplexed over the twisted pair wires 106-n to the NIDs 108-n. The NIDs 108-n then distribute the signals to and from the CPE 118-n. The data protocols normally used for transmitting data between the ONU 104 and the NIDs 108-n, and between the NIDs 108-n and the CPE 118-n within the home or building 114-n are 10 Base-T and 100 Base-T Ethernet. The Ethernet lines may extend up to 500 feet from the ONU 104 to the NIDs 108-n, and up to 100 feet from the NIDs 108-n to the CPE 118-n.

In this configuration, the ONU 104 and NIDs 108-n are exposed to surges from twisted pair wires 106-n placed outside that are subject to lightning strikes and power (50 or 60 Hz) surges. Thus, a surge protection circuit 200 (see FIG. 3) is connected in series with the transmission elements 106-n, 116-n, where the surge protection circuit 200 is located either at the ONU 104 at the NID 108-n, or at both.

During transmission of the signals along the line 106-n, it is important that the individual wires 110-n and 112-n remain longitudinally balanced, i.e., the currents are the same magnitude and run in opposite directions on each line 110-n and 112-n, so that the magnetic fields generated by the electrical energy flow are canceled. If a balance is not maintained, then a longitudinal voltage may be generated on the line 106-n. This unbalanced energy flow causes crosstalk, which is very undesirable, and which may result in signal loss.

Figure 3:
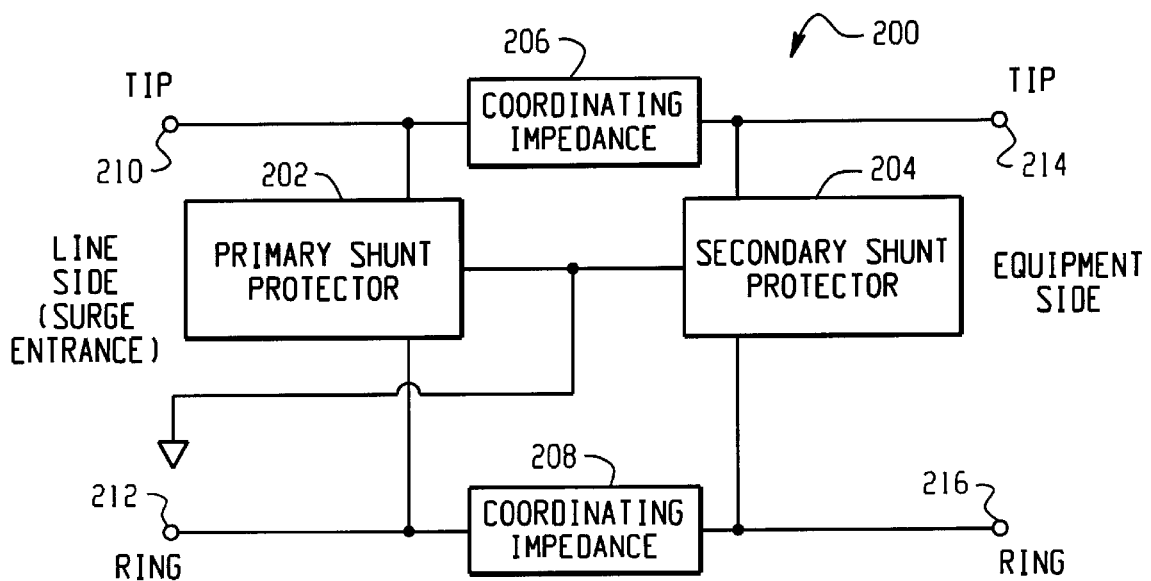
FIG. 3 is a general schematic diagram of the surge protection circuit according to a first embodiment of the present invention.

FIG. 3 sets forth a surge protection circuit 200 according to a first embodiment of the present invention. The surge protection circuit 200 includes a primary shunt protector 202 and a secondary shunt protector 204, which are coupled together through first and second coordinating impedances 206 and 208 connected in series with twisted pair wires 106-n. Preferably, the coordinating impedances 206 and 208 are capacitor-based impedances, i.e., they include a capacitive element.

The surge protection circuit 200 is employed at the ONU 104 and/or inside the NID (108-1 through 108-n). Thus, two surge protectors are typically employed for each twisted pair connection. The surge protection device at the ONU 104 connects the ONU such that the equipment side terminals 214, 216 connect to the ONU, and line side terminals 210, 212 connect to the unprotected twisted pair line (106-1 to 106-n) that extends to the NID (108-1 through 108-n). The protector 200 residing in the NID (108-1 through 108-n) is correspondingly connected such that terminals 210, 212 connect to the unprotected twisted pair line (106-1 to 106-n) from the ONU 104, and equipment side terminals 214, 216 connect to the inside wiring of structures 114-1 to 114-n.

Figure 4:
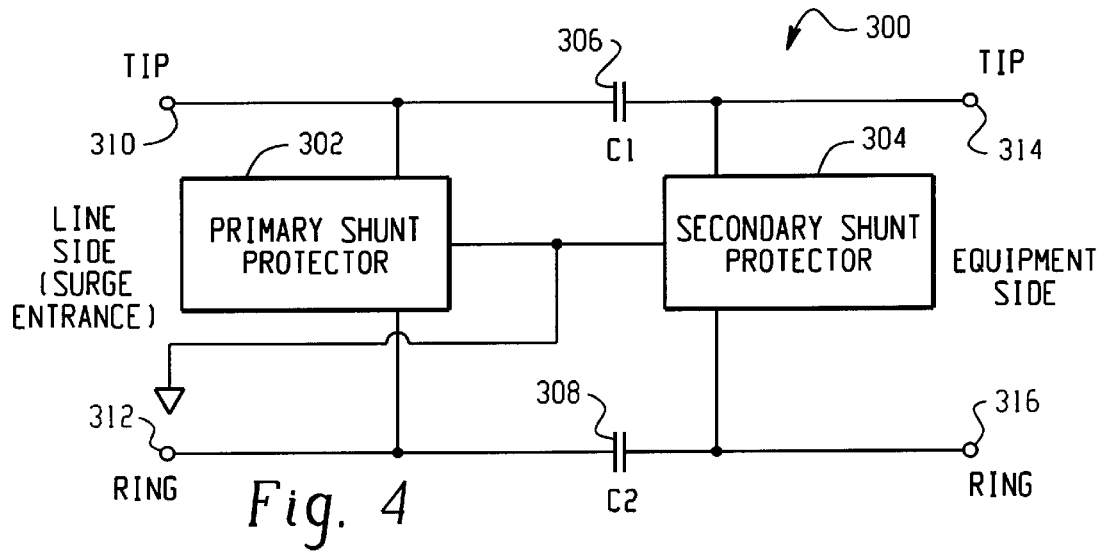
FIG. 4 is a schematic diagram of the surge protection circuit according to a second embodiment of the present invention.

Turning now to FIG. 4, a surge protection circuit 300 according to a second preferred embodiment of the present invention is shown. In this second embodiment, the first shunt protector 302 and the second shunt protector 304 are coupled together through coordinating capacitors 306 and 308. By replacing the coordinating resistance devices 30 and 32 of the known device 10 with capacitors 304 and 308, the signal loss caused by the resistive series impedance is reduced, and approaches zero as the frequency increases. Also, the capacitors 304 and 306 reduce any impedance disturbance in the data path that is caused by using resistance devices 30 and 32, which usually results in unwanted reflections of the signal. These reflections can increase electromagnetic radiation and distort the shape of the signal.

Preferably, the capacitors 306 and 308 are 1000 V, 0.1 $\mu$F capacitors that provide adequate coupling for signals such as 10 Base-T Ethernet. Since the capacitors 306 and 308 have low impedance at typical Ethernet data rates, the longitudinal balance and return loss are easily maintained. Further, the capacitor-based coordinating impedances 306 and 308 exhibit a low impedance across an entire range of critical frequencies typically employed for Ethernet networks.

By using the capacitors 306 and 308, during a surge on the twisted pair wires 106-n, the magnitude of the current flowing through the circuit 300 is limited relative to the rate of rise of the surge voltage. For example, a typical rate of rise of a voltage from a surge caused by a lightning strike is 100 V/$\mu$s. The use of a 0.1 $\mu$F capacitor limits the current of such a surge to a maximum of 10 A into the secondary shunt protector 304. A surge current of this level is easily handled with the secondary shunt protector 304. In contrast, if a resistance device 30 and 32 were used, such as a 7 Ohm device as is typical, then the magnitude of the current during a surge could reach much higher. Also, when the surge is caused by an AC power (60 Hz) surge, the capacitors 306 and 308 limit the current to a very small value since the capacitor impedance exceeds 26 KOhms at these frequencies.

There are a number of considerations for selecting the capacitors 306 and 308 for the coordinating impedances 206 and 208. The capacitors 306 and 308 must be able to survive the surge voltage and the surge current since the capacitors 306 and 308 can be damaged from a voltage or current surge even if the surge into the protection circuit 300 has a slow rise time. In circuit 300, the capacitors 306 and 308 charge as the voltage increases. The capacitors 306 and 308 have a quick charge and discharge rate such that they can charge simultaneous with the voltage rise. Then, when the primary protector 302 reaches its firing potential and fires, the capacitor charge is dumped through the primary 302 and secondary 304 shunt protectors. The magnitude of this discharge current, which is based on the impedance of the circuit 300, is very hard on the capacitors 306 and 308, and larger, more rugged capacitors must be used for larger currents. Thus, to withstand a large discharge current, large and costly capacitors 306 and 308 would be required.

Figure 5:
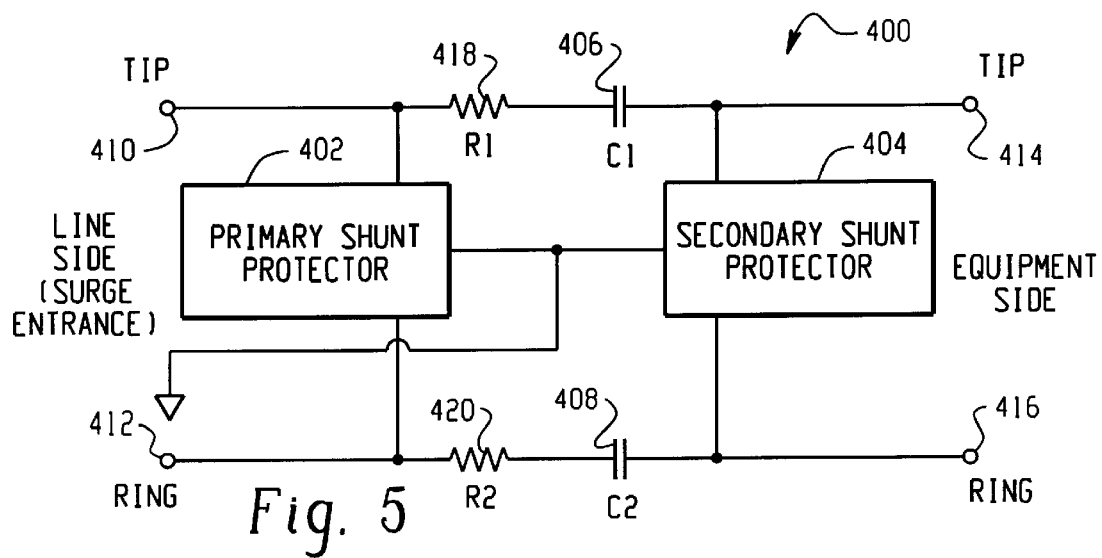
FIG. 5 is a schematic diagram of the surge protection circuit according to a third embodiment of the present invention.

As seen in FIG. 5, a surge protection circuit 400 according to a third embodiment of present invention is shown. This surge protection circuit 400 couples the primary 402 and secondary 404 shunt protectors though capacitors 406 and 408 and resistance devices 418 and 420, connected in series. These resistance devices 418 and 420 are preferably as small as 1 Ohm. By placing the resistance devices 418 and 420 in the protection circuit 400, the peak surge current is limited, protecting the capacitors 406 and 408. Thus, smaller and less costly capacitors 406 and 408 can be used relative to the capacitors 306 and 308 in FIG. 4.

Figure 6:
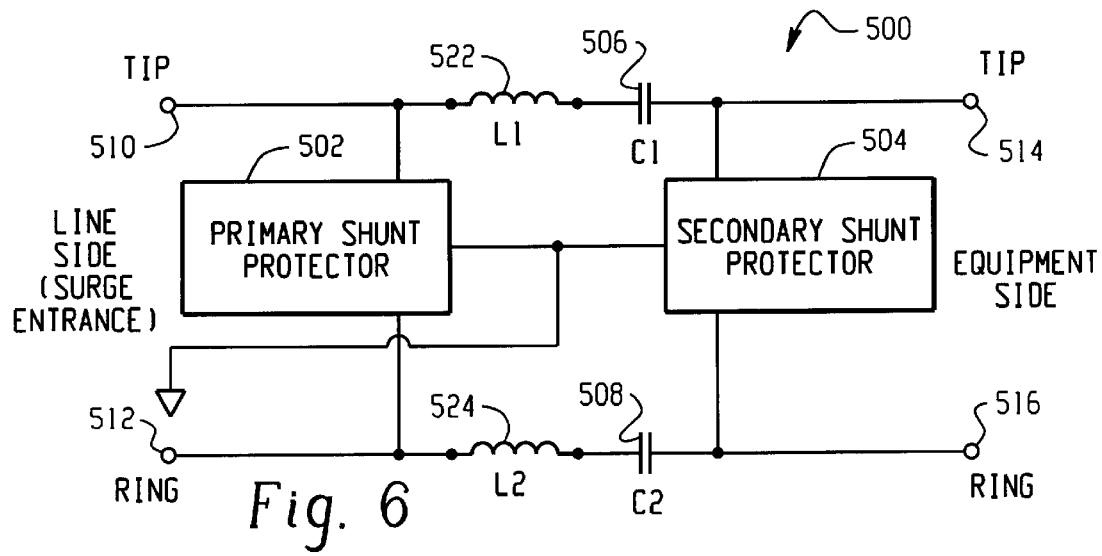
FIG. 6 is a schematic diagram of the surge protection circuit according to a fourth embodiment of the present invention.

As shown in FIG. 6, a surge protection circuit 500 according to a fourth embodiment of the present invention is shown. In this surge protection circuit 500, the resistance devices 418 and 420 used in the third embodiment shown in FIG. 5 are replaced by inductors 522 and 524. These inductors 522 and 524 operate similarly to the resistance devices 418 and 420 in that they limit the peak surge current to protect the capacitors 506 and 508. An advantage of using the inductors 522 and 524 instead of the resistance devices 418 and 420 is that if the impedance value of the inductors 522 and 524 is small, there is insignificant loss at the highest data rate frequency component. Further, even this small loss may be tuned out, as is described in detail below with reference to FIG. 7.

Figure 7:
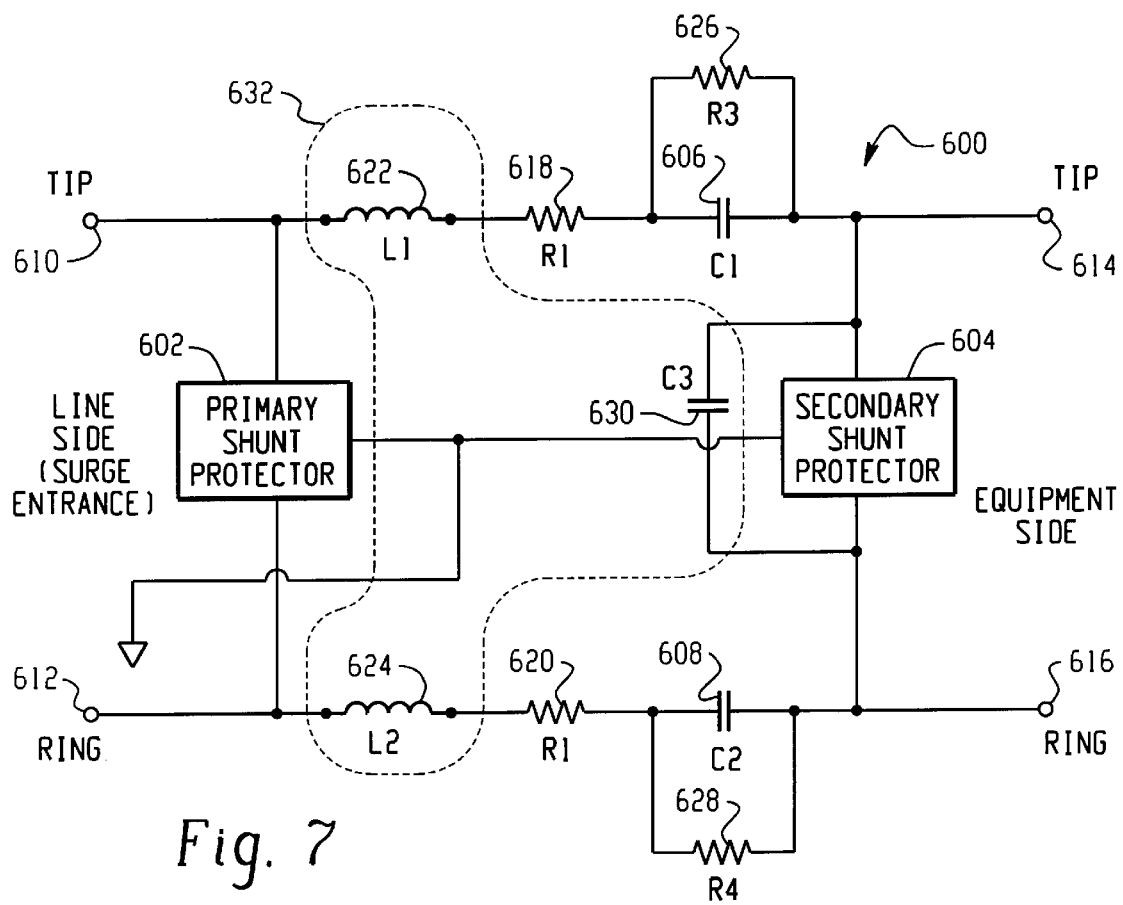
FIG. 7 is a schematic diagram of the surge protection circuit according to a fifth embodiment of the present invention.

Turning now to FIG. 7, a surge protection circuit 600 according to a fifth embodiment of the present invention is shown. In this protection circuit 600, the coordinating impedances are comprised of capacitors 606 and 608, resistance devices 618 and 620, and inductors 622 and 624 all connected in series with the twisted pair wires 106-n. The coordinating impedances further include resistance devices 626 and 628 connected in parallel with capacitors 606 and 608. Also, a capacitive device 630, which is preferably a capacitor, is connected across the secondary shunt protector 604. Preferably, the value of the inductors 622 and 624 are 0.25 $\mu$H, the value of the capacitors 606 and 608 are 0.1 $\mu$F, and the value of the resistors 618 and 620 are 1 Ohm.

In this configuration, by connecting resistance devices 626 and 628 in parallel with the capacitors 606 and 608, the resistance devices 626 and 628 reduce the surge current that the capacitors 606 and 608 must handle. If the protection circuit 600 must pass low frequencies, the resistance devices 626 and 628 could be chosen at a value such as 7 Ohms. With the capacitors 606 and 608 bypassing the resistors 626 and 628, the signal loss would be low at higher frequencies and the resistors 626 and 628 would reduce the signal loss for low frequencies. Thus, this configuration of protection circuit 600 allows for both data and telephony applications of the system 100 where the resistors 626 and 628 pass voice frequencies and the capacitors 606 and 608 pass data frequencies. Thus, a single surge protector design could be utilized for either telephony or data signals.

The inductors 622 and 624 are used to shape the rate of the rise current in the capacitors 606 and 608. This is important when there is a sudden discharge from the capacitors 606 and 608 caused when protector 602 fires. By using the inductors 622 and 624, the discharge rate is slowed down. Also, the use of the inductors 622 and 624 further limits the surge current beyond that provided by the use of resistance devices 618 and 620 alone. Further, the use of the inductors 622 and 624 reduces the size and cost of the required capacitors 606 and 608.

Any loss due to the inductors 622 and 624 is eliminated through the connection of the capacitive device 630 across the secondary shunt protector 604. In this configuration, the capacitive device 630 tunes with the inductors 622 and 624 to form a filter 632 that provides a filtering function. For example, in the arrangement of FIG. 7, a three pole low pass filter 632 is formed. This filter 632 decreases the signal loss at 10 MHz, which is the preferred frequency for 10 Base-T Ethernet.

Preferably, for a 100 Ohm impedance twisted pair wire 106-n, the inductors 622 and 624 are 0.25 $\mu$H and the capacitor 630 is 50 $\mu$F. Further, in an alternative arrangement, the capacitive device 630 includes the shunt capacitance of the secondary shunt protector 606 supplemented, if required, by a capacitor to result in the proper filter design.

In another alternative arrangement, the inductors 622 and 624 are eliminated from the protection circuit 600 by increasing the impedance value of the resistance devices 618 and 620. This is accomplished because both of these elements are being used to limit the peak current flowing into the capacitors 606 and 608. By increasing the impedance value of the resistance devices 618 and 620, signal loss on line 106-n and/or 116-n rises. Accordingly, the use of a 1 ohm resistor for the resistance devices 618 and 620 is a preferred configuration so that there is a satisfactory compromise between the resulting signal loss and the protection of the capacitors 606 and 608.

Figure 8:
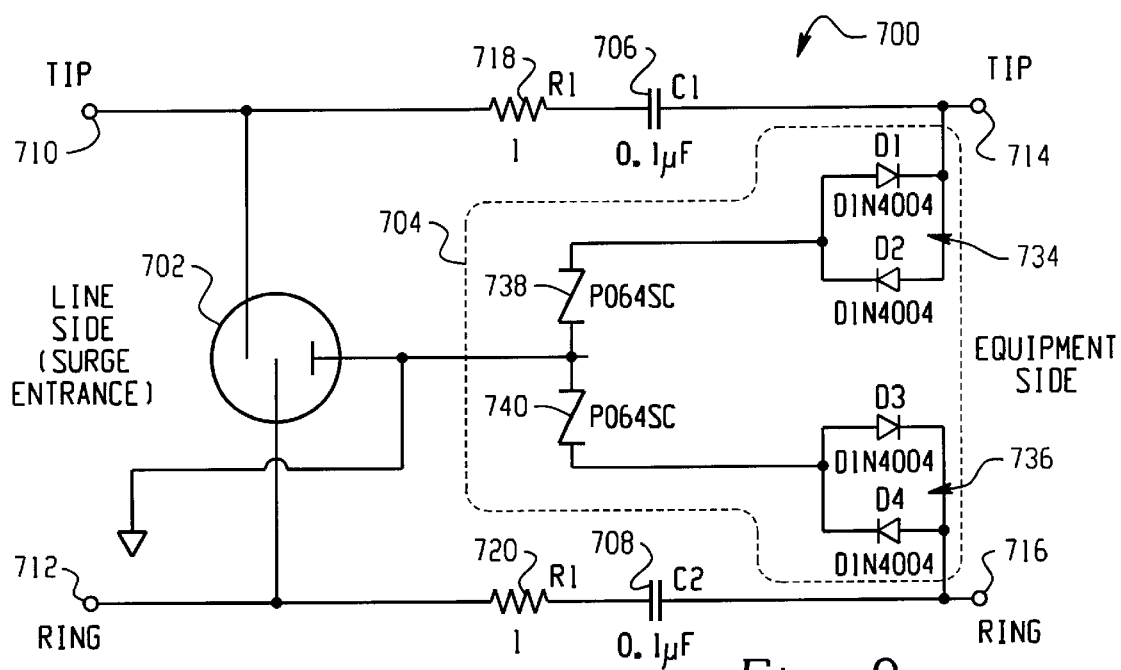
FIG. 8 is a circuit architecture of the surge protection circuit according to a sixth embodiment of the present invention.

Turning to FIG. 8, a circuit architecture of a surge protector 700 of a sixth embodiment of the present invention is shown. The primary shunt protector 702 and the secondary shunt protector 704 are coupled through a coordinating impedance that preferably includes capacitors 706 and 708, and resistance devices 718 and 720 connected in series with the twisted pair wires 106-n. In the protection circuit 700, the primary shunt protector 702 preferably includes a 3-element gas tube. Further, the secondary shunt protector 704 preferably includes two sets of diode pairs 734 and 736, and two sidactors 738 and 740. The operation of this protection circuit 700 is similar to the operation of protection circuit 600 described above in reference to FIG. 7. Preferably, the capacitors 706 and 708 are 0.1 $\mu$F, and the resistance devices 718 and 720 are 1 Ohm.

In alternative arrangements, the surge protection circuit 200 of the present invention may be part of only the secondary shunt protector 204 when the primary and secondary protectors 202 and 204 are located in difference devices. For example, in telephony equipment the primary shunt protector 202 includes a five-prong pair plug-in gas tube and the secondary shunt protector 204 includes both the capacitor-based coordinating impedances 206 and 208 and the shunt protector 204.

In other alternative arrangements, there could be two protection circuits 200 in the NID 108-n, which protects the device 118-n inside of the structure 114-n from the lighting or power (60 Hz) surges interacting with the outside wiring 106-n. One of the protection circuits 200 would be on the transmit line 110-n and one on the receive line 112-n of the twisted pair wires 106-n, where the two protectors 200 would preferably be integrated into one package.

In still another arrangement, the primary 202 and secondary 204 shunt protectors could be configured as a 5-prong unit such that there would be one protection circuit 200 in each 5-prong unit rather than two protectors 200 based on the wiring of the 5-prong unit. Therefore, there would be one protection circuit 200 for each twisted pair wire 110-n and 112-n.

The invention has been described with reference to preferred embodiments. Those skilled in the art will perceive improvements, changes, and modifications. Such improvements, changes, and modifications are intended to be covered by the appended claims.

I claim:

1. A surge protection circuit for use in a broadband communication system carrying high-speed digital signals, comprising:
   a first line-side transmission wire;
   a second line-side transmission wire;
   a first equipment-side transmission wire;
   a second equipment-side transmission wire;
   a primary shunt protector coupled between the first and second line-side transmission wires and ground;
   a secondary shunt protector coupled between the first and second equipment-side transmission wires and ground;
   a first coordinating impedance circuit coupled between the first line-side transmission wire and the first equipment-side transmission wire, wherein the first coordinating impedance circuit comprises (a) a first inductor, (b) a first resistance device coupled in series with the first inductor, (c) a first capacitor coupled in series with the first resistance device, and (d) a second resistance device coupled in parallel with the first capacitor;
   a second coordinating impedance circuit coupled between the second line-side transmission wire and the second equipment-side transmission wire, wherein the second coordinating impedance circuit comprises (a) a second inductor, (b) a third resistance device coupled in series with the second inductor, (c) a second capacitor coupled in series with the third resistance device, and (d) a fourth resistance device coupled in parallel with the second capacitor; and
   a third capacitor coupled between the first equipment-side transmission wire and the second equipment-side transmission wire.

2. The surge protection circuit of claim 1, wherein the values of the first and second inductors and the third capacitor are chosen to form a filter that only passes signals within a desired frequency range.

3. The surge protection circuit of claim 1, wherein the first and second coordinating impedance circuits are configured to pass 10 Base-T Ethernet transmissions.

4. The surge protection circuit of claim 1, wherein the first and second coordinating impedance circuits are configured to pass 100 Base-T Ethernet transmissions.

5. The surge protection circuit of claim 1, wherein the high-speed digital signals have a frequency of at least 10 MHz.

6. A surge protection circuit for use in a broadband communication system carrying high-speed digital signals, comprising:
   a first line-side transmission wire;
   a second line-side transmission wire;
   a first equipment-side transmission wire;
   a second equipment-side transmission wire;
   a three-element gas tube coupled between the first and second line-side transmission wires and ground;
   a first diode pair and a first sidactor coupled in series between the first equipment-side transmission wire and ground;
   a second diode pair and a second sidactor coupled in series between the second equipment-side transmission wire and ground;
   a first coordinating impedance circuit coupled between the first line-side transmission wire and the first equipment-side transmission wire, wherein the first coordinating impedance circuit comprises a first resistance device coupled in series with a first capacitor; and
   a second coordinating impedance circuit coupled between the second line-side transmission wire and the second equipment-side transmission wire, wherein the second coordinating impedance circuit comprises a second resistance device coupled in series with a second capacitor.

7. A digital loop-carrier system, comprising:
   an optical network unit that receives high-speed digital signals from a fiber optic telecommunication line and transmits the high-speed digital signals on a plurality of line-side twisted wire pairs, wherein each line-side twisted wire pair includes a line-side TIP signal wire and a line-side RING signal wire;
   a plurality of network interface devices that each receive the high-speed digital signals on one of the line-side twisted wire pairs and transmit the high-speed digital signals to consumer devices on one or more equipment-side twisted wire pairs, wherein each equipment-side twisted wire pair includes an equipment-side TIP signal wire and an equipment-side RING signal wire; and
   a surge protection circuit located within each network interface device, wherein each surge protection circuit comprises:
      a primary shunt protector coupled between the line-side twisted wire pair and ground,
      a secondary shunt protector coupled between the equipment-side twisted wire pair and ground,
      a first coordinating capacitor coupled between the line-side TIP signal wire and the equipment-side TIP signal wire, and
      a second coordinating capacitor coupled between the line-side RING signal wire and the equipment-side RING signal wire.

8. The digital loop-carrier system of claim 7, wherein the surge protection circuit further comprises:
   a first resistance device coupled in series with the first coordinating capacitor; and
   a second resistance device coupled in series with the second coordinating capacitor;

wherein the values of the first and second resistance devices are chosen such that there is substantially no signal loss in the high-speed digital signal.

9. The digital loop-carrier system of claim 7, wherein the surge protection circuit further comprises:
   a first inductor coupled in series with the first coordinating capacitor; and
   a second inductor coupled in series with the second coordinating capacitor;
   wherein the values of the first and second inductors are chosen such that there is substantially no signal loss in the high-speed digital signal.

10. The digital loop-carrier system of claim 7, wherein the surge protection circuit further comprises:
    a first inductor and a first resistance device coupled in series with the first coordinating capacitor; and
    a second inductor and a second resistance device coupled in series with the second coordinating capacitor;
    wherein the values of the first and second inductors and the values of the first and second resistance device are chosen such that there is substantially no loss in the high-speed digital signal.

11. The digital loop-carrier system of claim 10, wherein the surge protection circuit further comprises:
    a third resistance device coupled in parallel with the first coordinating capacitor; and
    a fourth resistance device coupled in parallel with the second coordinating capacitor.

12. The digital loop-carrier system of claim 11, wherein the surge protection circuit further comprises:
    a filtering capacitor coupled between the equipment-side TIP signal wire and the equipment-side RING signal wire.

13. The digital loop-carrier system of claim 7, wherein the surge protection circuits are located at the optical network unit, and are configured to protect the optical network unit from surges on the line-side twisted wire pairs.

14. The digital loop-carrier system of claim 7, wherein additional surge protection circuits are located at the optical network unit, and the additional surge protection circuits are configured to protect the optical network unit from surges on the line-side twisted wire pairs.

* * * * *